United States Patent
Heetman

[11] 3,785,198
[45] Jan. 15, 1974

[54] SCRATCH RESISTANCE TESTER

[75] Inventor: Jakobus Heetman, Koblenz, Switzerland

[73] Assignee: Lonza Ltd., Gampel/Valais, Switzerland

[22] Filed: June 13, 1972

[21] Appl. No.: 262,173

[30] Foreign Application Priority Data
June 14, 1971 Switzerland.................. 8626/71

[52] U.S. Cl. .................................................. 73/78
[51] Int. Cl. ............................................ G01n 3/46
[58] Field of Search .............................. 73/81, 78

[56] References Cited
UNITED STATES PATENTS
2,801,540  8/1957  Rondeau ........................ 73/78 X
2,279,264  4/1942  Hoffman ........................... 73/78

Primary Examiner—James J. Gill
Attorney—Christen & Sabol and Virgil H. Marsh

[57] ABSTRACT

A scratch resistance or hardness tester is disclosed wherein a test point is guided across two flat parallel surfaces of a test specimen. The testing point is loaded in the direction of one of the surfaces of the test specimen and is disposed movably in that direction. A path or track, along which the test point and a receiving surface for the test specimen, against which the other of its two flat parallel surfaces is intended to fit, are movable relative to one another in order to guide the test point across the first mentioned surface of the test specimen. The path together with the receiving surfaces enclose or form an acute angle. The test point is loaded with the force of a pendulum which increases when there is an increased deflection from its rest position.

11 Claims, 3 Drawing Figures

PATENTED JAN 15 1974 3,785,198

SCRATCH RESISTANCE TESTER

BACKGROUND OF THIS INVENTION

1. Field of This Invention

The invention relates to a scratch resistance or hardness tester, and more specifically relates to such a tester wherein a test point is guided across two flat parallel surfaces of a test specimen, said test point being loaded in the direction toward one of the surfaces and being disposed movably in said direction.

2. Prior Art

In the known scheme and apparatus for determination of scratch resistance according to Martens, the load of the testing point (scratching diamond) is considered in grams as a unit of measurement for the hardness of the test specimen which produces a scratch width of 0.01 mm. Such prior art determination of hardness, when used in the case of metals, requires a microscopic measurement of the width of the scratch.

BROAD DESCRIPTION OF THIS INVENTION

An object of this invention is the determination of the scratch resistance materials, and especially the hardness of soft materials, preferably plastics, in a simpler manner.

This object is achieved by using the scratch resistance or hardness tester of this invention. The path along which the test point of the tester and a receiving surface for the test specimen, against which the other of its two flat parallel surfaces is intended to fit, are movable relative to one another in order to guide the test point across the first mentioned surface of the test specimen. The path together with the receiving surface produces or forms an acute angle. The test point is loaded with the force of a pendulum that increases when there is increased deflection from its rest position.

During the resistance using this scatch resistance tester, the load of the test point changes continuously while the test point is guided across the surface of the test specimen that is being checked or tested. The hardness then can be evaluated using or from the load of the test point which is required in order to scratch the surface of the test specimen. Beyond that, it also possible to determine, for example, the load which leads to a plastic deformation, or the load at which a chip is cut, from the track or path of the test point at and on the surface of the test specimen. Such capability makes it possible to obtain more differentiated and useful testing, especially of plastics.

DETAILED DESCRIPTION OF THIS INVENTION

The preferred embodiment of this invention is described in detail below using the schematic drawing. In the drawing.

Figure 1:
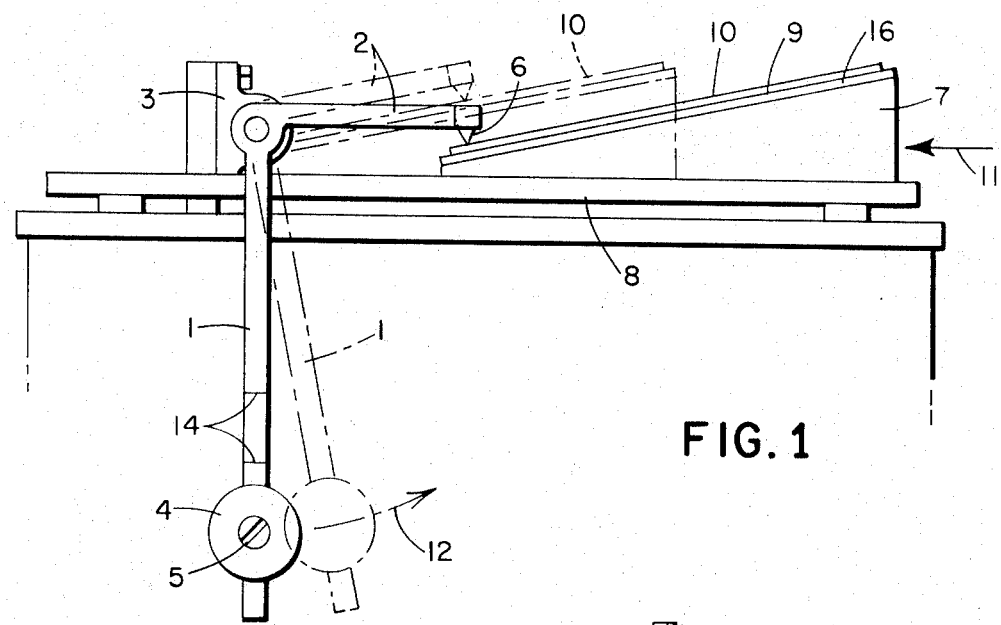
FIG. 1 shows an elevation projection of the scratch resistance tester.

The scratch resistance tester shown in the drawing has a toggle lever (1, 2) that is mounted in locally affixed roller bearing 3. Lever arm 1 extends downwards, carries weight 4 and constitutes, together with weight 4, a pendulum. Weight 4 can be adjustably fixed by means of clamping screw 5 on lever arm 1. The other arm 2, together with arm 1, constitutes a right angle, is horizontally angular and carries test point 6 at its free end. For the testing of the scratch resistance of plastics (synthetic substances), a saphire, such as those used for the playing of long playing records, is suitable as the test point.

Cradle 7 is slidable (adjustable) on locally affixed tracks 8 and has a receiving surface 9 for plastic foil 10, whose scratch resistance is to be determined. Receiving surface 9 and tracks 8 enclose an acute angle (for example, 10°).

Whenever cradle 7 is shifted from the position shown in a solid line in the drawing, in the direction of arrow 11, plastic foil 10 attached to cradle 7 lifts test point 6, whereby the pendulum (1,4) swings in the direction of arrow 12, as indicated by a dash-dot line in FIG. 1. The force occurring thereby, which strives to return the pendulum (1,4) to the position shown in FIG. 1 by a solid line, produces a torque on the toggle lever (1,2), which will put testing point 6 under more of a load in the direction of plastic foil 10 and the greater the deflection of the pendulum (1,4), i.e., the farther cradle 7 is shifted in the direction of arrow 11. Consequently, the force with which test point 6 presses onto plastic foil 10 increases continuously whenever cradle 7 is shifted in the direction of arrow 11.

At the same time, test point 6 leaves a track on the plastic test specimen (10) that is at first a pressure track (plastic deformation), then a scratch track and finally a track formed by cutting of a chip. It is possible to calculate the load of the testing point, for example, from the length of the lever, the weight of the pendulum and the deflection of the pendulum for each place of the track or it can be determined by means of a spring balance applied to the free end of arm 2. Effectively, surface 9 has scales 13 (see FIG. 2) from which the occurring load of test point 6 can be read on the places of plastic foil which correspond to the scale marks. To each scale mark a position of weight 4 on lever arm 1 is designated by a mark 14 (see FIG. 1). Also, such marks, which however are not provided on the test instrument, can also be placed on the plastic foil in order to determine the results of the test for the scratch resistance values after the latter is removed from the scratch resistance tester.

The length of lever arm 2, the position of the axis of the toggle lever (1,2) and its angle are selected in such a manner that surface 9 in the one as well as the other terminal position of cradle 7 will be as nearly as possible at an acute angle relative to the lever axis, so that test point 6 is always loaded approximately at rightangles to surface 9. This condition can be better fulfilled the longer lever arm 2 is.

For various ranges of measurements, the angle between surface 9 and tracks 8 can be adjustable, in addition to the already mentioned adjustment of weight 4.

The surface of the test specimen, the hardness of which is to be determined, must be clean, and it must not have or contain any film having lubricant characteristics.

In order to determine the scratch resistance of the surface of the test specimen at temperatures different than room temperature, receiving surface 9 can be either heated or cooled by appropriate means well known to those ordinarily skilled in the art. Such appropriate means is illustrated by the heating element 16 in FIG. 1.

In order to test the uniformity of the scratch resistance measurements on the surface of a test specimen, several traces can be produced simultaneously and parallel to one another by shifting the toggle lever after recording of a trace in the direction of its rotational axis in order to record an additional trace, or by equiping the scratch resistance tester described herein with several toggle levers which each have a pendulum weight and testing point. In the case of a design with several toggle levers, their pendulum arms can be of different lengths and/or their pendulum weight can be of different values in order to simultaneously test the testing points using different loads.

Figure 3:
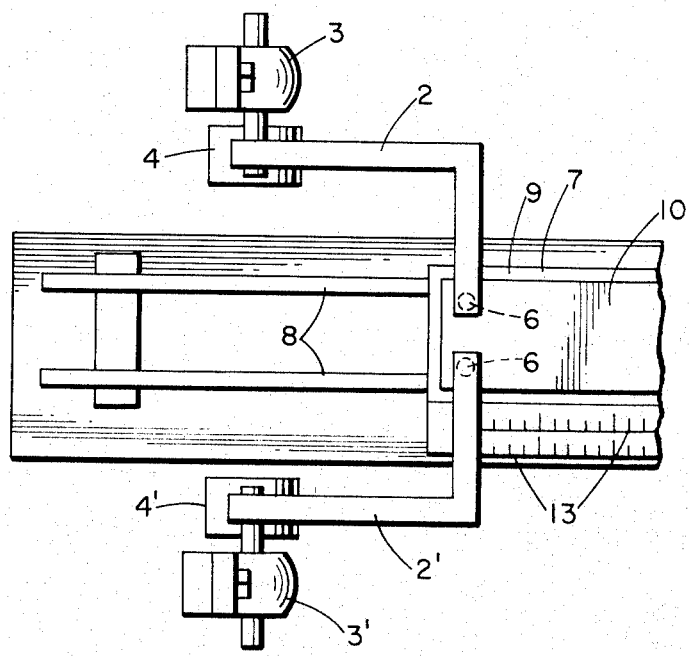
FIG. 3 shows a horizontal projection of the scratch resistance tests containing a two pendulum arm and test point arrangement.

FIG. 3 illustrates the use of two pendulum arm and test point arrangements for the simultaneous tracing of two scratch lines on a test specimen. The second pendulum arm and test point arrangement is indicated by numerals 2', 3', 4', and 6'.

Figure 2:
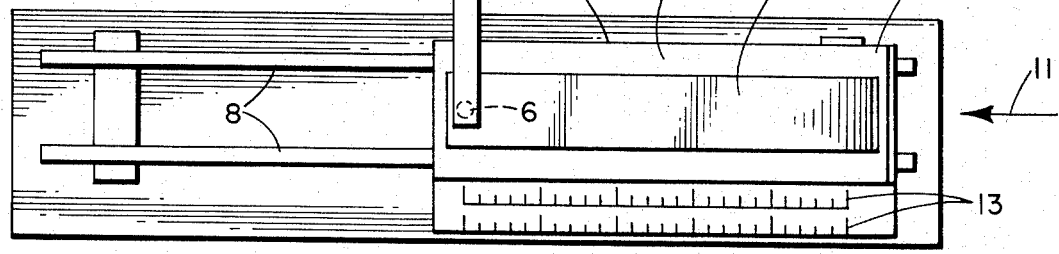
FIG. 2 shows a horizontal projection of the scratch resistance tester.

The trace made by one pendulum arm and test point arrangement can be duplicated by moving the location of the test point on the surface on the test specimen, i.e., by sliding the pendulum to the desired position as illustrated in FIG. 2.

The shifting of cradle 7 is accomplished effectively by means of a motor drive with gear and gear rack or with a threaded spindle, for example, with the speed of 30 cm per minute.

Examples of solid synthetic plastic materials which can be tested by the scratch resistance tester of this invention are: acrylonitrile-butadiene-styrene plastics; acetal homopolymers and copolymers; acrylic plasticis, such as, methyl methacrylate homopolymers, methyl methacrylate - styrene copolymers and methyl methacrylate - alpha methyl styrene copolymers; allyl plastic, such as, diallyl phthalate plastics; cellulosic plastics, such as ethyl cellulose plastics, cellulose acetate plastics, cellulose acetate butyrate plastics, and cellulose nitrate plastics; such as chlorinated polyethers; epoxy plastics; fluoroplastics, such as, polychlorotrifluoroethylenes, polyvinylidene fluorides and polytetrafluoroethylenes; furan plastics; melamine-formaldehyde plastics; nylons; polybutylenes; phenol-formaldehyde plastics; phenol-furfural plastics; phenoxy plastics; polycarbonates; polyesters; alkyd plastics; poly(aromatic) imides; polyphenylene oxides; polyethylenes, including ethylene-ethyl acrylate copolymers and ethylene-vinyl acetate copolymers; polypropylenes; polysulfones; polystyrenes, including styrene-acrylonitrile pllastics and styrene-butadiene plastics; silicone plastics; urea-formaldehyde plastics; urethane plastics; vinyl plastics, such as, vinyl chloride plastics vinyl chloride-acetate plastics, vinyl butyral plastics, vinylidene chloride plastics, vinyl formal plastics and polyvinyl dichlorides; and mixtures of such plastic materials.

I claim:

1. A scratch resistance tester which comprises:
   a. a support which contains a flat receiving surface;
   b. a substantially vertical gravity pendulum;
   c. a test point rigidly connected to an arm extending from said pendulum and adapted to contact a flat test specimen received on said flat receiving surface of said support; and
   d. a substantially horizontal track at substantially right angles to a vertical plane containing said pivot axis of said pendulum, said support being movably along said track, the distance between said track and said flat receiving surface being shorter at the end towards said pivot axis so that said pendulum is deflected from its lowest or rest position when said support is moved along said track towards said pivot axis, said test point contacting said flat test specimen on said flat receiving surface, moving over the surface of said flat test surface when said support is moved in such a manner, the test surface being scratched by said test point during said movement, the force on said test point increasing as said pendulum is moved further from its lowest or rest point, and the longitudinal direction on said track enclosing, with the tangent of the movement of said test point produced by said deflection of said pendulum, substantially a right angle.

2. The scratch resistance tester of claim 1 wherein said flat receiving surface of said support encloses, with the path of movement of said support, an adjustable angle.

3. The scratch resistance tester of claim 1 wherein said support is a cradle that is slidable on said track.

4. The scratch resistance tester of claim 1 wherein said flat receiving surface of said support can be heated or cooled.

5. The scratch resistance tester of claim 1 wherein said pendulum contains a pendulum weight that is adjustable along its arm, the pivot axis of said pendulum being parallel to said track.

6. The scratch resistance tester of claim 1 which contains a toggle lever, one arm of which carries a weight and constitutes said pendulum, and on the other arm of which said testing point is attached, said toggle lever being located so that its pivot axis is perpendicular to said track.

7. The scratch resistance tester of claim 1 wherein said pendulum is adjustable in the direction of the pendulum axis for the successive recording of several adjacent test traces on the surface of said test specimen.

8. The scratch resistance tester of claim 1 wherein several pendulums are used, each loading a test point and arranged coaxially or axparallel, one beside the other, for the simultaneous recording of several test traces on the surface of said test specimen.

9. The process of testing a flat test specimen using the scratch resistance tester of claim 1 which comprises placing said flat test specimen on said flat receiving surface, contacting said test point with said flat test specimen, advancing said support along said track towards said pivot axis, disengaging said test point from said flat test specimen, and removing said flat test specimen from said flat receiving surface.

10. The process of testing a flat test specimen using the scratch resistance tester of claim 2 which comprises placing said flat test specimen on said flat receiving surface, contacting said test point with said flat test specimen, advancing said support along said track towards said pivot axis, disengaging said test point from said flat test specimen, and removing said flat test specimen from said flat receiving surface.

11. The process of testing a flat test specimen using the scratch resistance tester of claim 4 which comprises placing said flat test specimen on said flat receiving surface, heating or cooling said flat test specimen, contacting said test point with said flat test specimen, advancing said support along said track towards said pivot axis, disengaging said test point from said flat test specimen, and removing said flat test specimen from said flat receiving surface.

* * * * *

UNITED STATES PATENT OFFICE
CERTIFICATE OF CORRECTION

Patent No. 3,785,198　　　　　　　　　Dated January 15, 1974

Inventor(s) Jakobus Heetman

It is certified that error appears in the above-identified patent and that said Letters Patent are hereby corrected as shown below:

In Claim 8, line 3, cancel "axparallel" and insert therefor --are parallel--.

Signed and sealed this 16th day of July 1974.

(SEAL)
Attest:

McCOY M. GIBSON, JR.　　　　　　C. MARSHALL DANN
Attesting Officer　　　　　　　　Commissioner of Patents